United States Patent [19] [11] B 3,919,586
Holman [45] Nov. 11, 1975

[54] GAUZE SUPPLY CONDUCTOR IN COIL UNIT FOR A TELEVISION CAMERA TUBE

[75] Inventor: Benedictus Timotheus Johannes Holman, Eindhoven, Netherlands

[73] Assignee: U.S. Philips Corporation, New York, N.Y.

[22] Filed: Apr. 18, 1974

[21] Appl. No.: 461,872

[44] Published under the Trial Voluntary Protest Program on January 28, 1975 as document no. B 461,872.

Related U.S. Application Data

[63] Continuation of Ser. No. 254,627, May 18, 1972, abandoned.

[30] Foreign Application Priority Data

May 22, 1971 Netherlands .................... 7107038

[52] U.S. Cl. .................... 315/8; 313/382; 313/389
[51] Int. Cl.$^2$ .................... H01J 31/28; H01J 31/38
[58] Field of Search .................... 315/8

[56] References Cited

UNITED STATES PATENTS

| | | | |
|---|---|---|---|
| 3,286,121 | 11/1966 | Lubszynski | 313/65 A X |
| 3,295,009 | 12/1966 | James | 315/8 |

FOREIGN PATENTS OR APPLICATIONS

| | | | |
|---|---|---|---|
| 7,102,201 | 8/1972 | Netherlands | 313/65 A |

*Primary Examiner*—Robert Segal
*Attorney, Agent, or Firm*—Frank R. Trifari; Henry I. Steckler

[57] ABSTRACT

So as to eliminate a frame-frequency, amplitude-modulated line-frequency interference signal, a coil unit for a television camera tube is provided with a gauze-connection loop such that the loop does not envelop the wall of a wire coil of a soft magnetic material which is always present in coils of this kind. A gauze-connection conductor which is to be specifically constructed for this purpose is situated in a neutral plane of the line-deflection field within the wire coil.

10 Claims, 7 Drawing Figures

GAUZE SUPPLY CONDUCTOR IN COIL UNIT FOR A TELEVISION CAMERA TUBE

Figure 1:
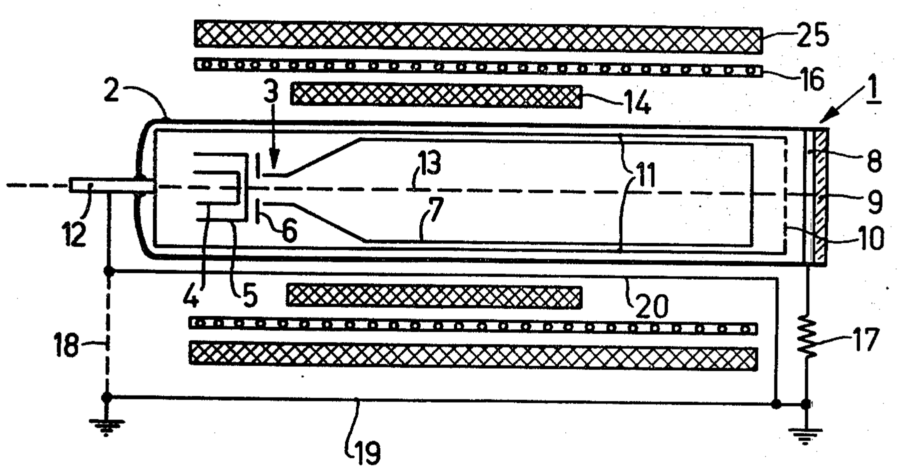

This is a continuation of application Ser. No. 254,627, filed May 18, 1972, now abandoned.

The invention relates to an electron-optical system, comprising a magnetic focussing unit, an electromagnetic deflection unit, and a helically wound wire coil of a soft magnetic material which is arranged between the focussing unit and the deflection unit, which is particularly suitable for use in a television camera tube comprising a target to be scanned by an electron beam and a gauze electrode arranged near the target.

An electron-optical system of this kind is known from German Pat. No. 1,095,313 in which a method is described of eliminating distortion, caused inter alia by the wire coil, of the television frame in a television camera tube. When use is made of an electronoptical system of this kind for a television camera tube having a gauze electrode which is arranged near the target, interference voltages occur in the video signals derived from the television camera tube. These interference voltages are produced, as described in U.S. Pat. No. 3,743,983, because the axially directed main focussing field causes an angular induction in the soft magnetic material. This angular induction causes an asymmetry, modulated with the frame frequency, in the magnetic return paths for the line deflection field, so that line-frequency interference voltages, amplitude modulated with the frame frequency, are produced between the target and the gauze electrode of the television camera tube.

The invention is based on recognition of the fact that the interfering modulated magnetic field is situated mainly in the wire-coil wall and that, in contrast therewith, the primary line-deflection air field is not substantially modulated. In known circuits for a television camera tube provided with an electron-optical system of the kind set forth, a gauze-connection loop is always provided which envelops the wire-coil wall. In a circuit of this kind the gauze-connection loop, therefore, causes the interfering modulated magnetic field.

The invention has for its object to eliminate the interference voltages associated therewith, and to this end an electron-optical system of the kind set forth is characterized in that a grid or gauze-connection loop, electrically connecting the target to the gauze electrode via a signal resistor, a gauze-supply conductor which is exterior with respect to the television camera tube, and an interior gauze connection conductor, does not envelop the wire-coil wall, the grid-supply conductor being arranged in a neutral plane of the line deflection field.

Because the gauze-connection conductor in accordance with the invention extends such that the gauze-connection loop does not envelop the wire-coil wall and hence the interfering modulated magnetic field, this magnetic field cannot cause interference voltages between the target and the gauze electrode. In order to prevent the appearance of interference voltages caused by the actual line-deflection field, it is necessary to arrange the gauze-supply conductor in a neutral plane of the line-deflection field.

Figure 2:
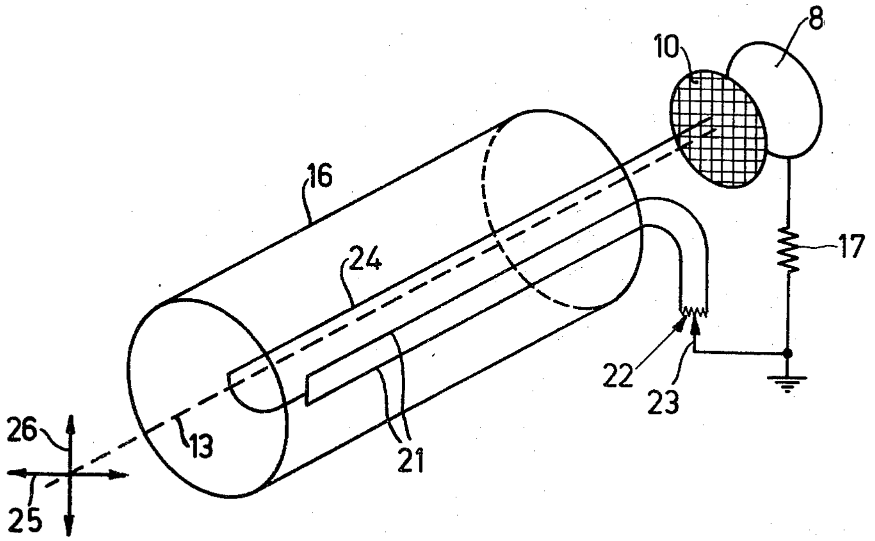
Figure 3:
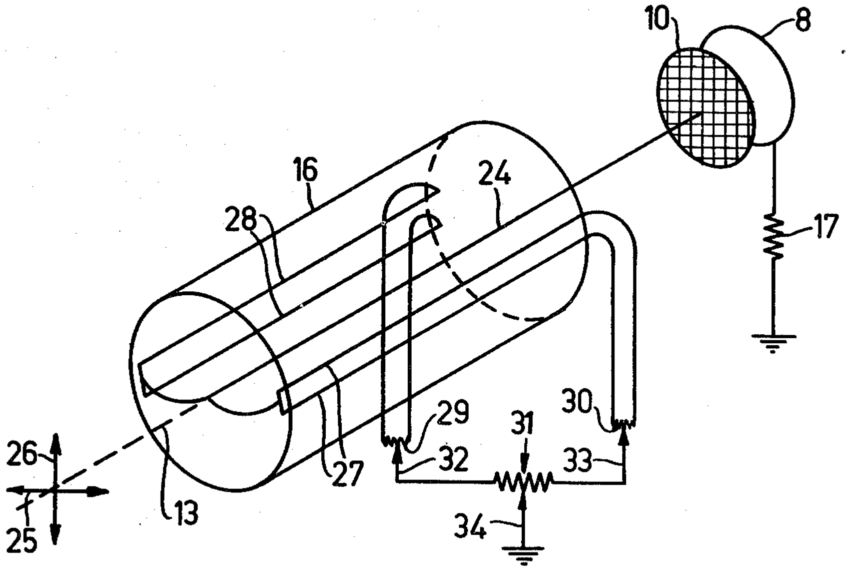
Figure 4:
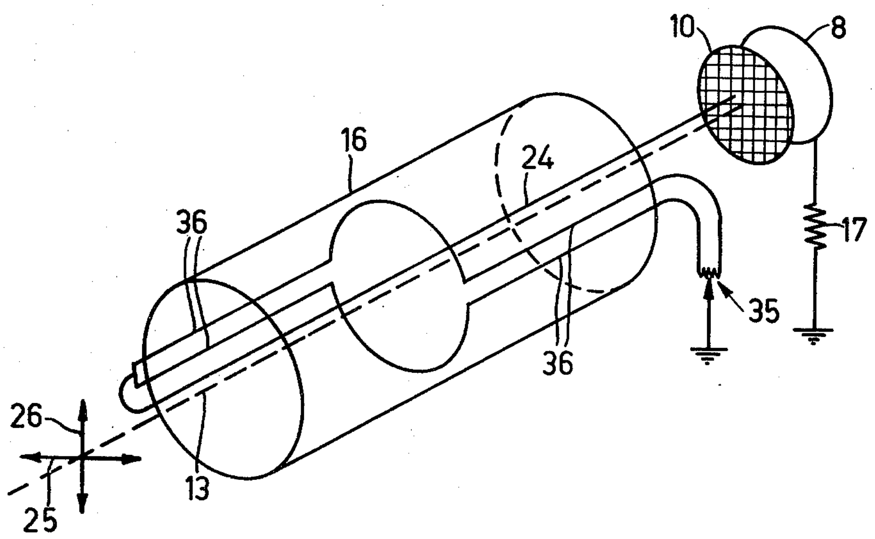
Figure 5:
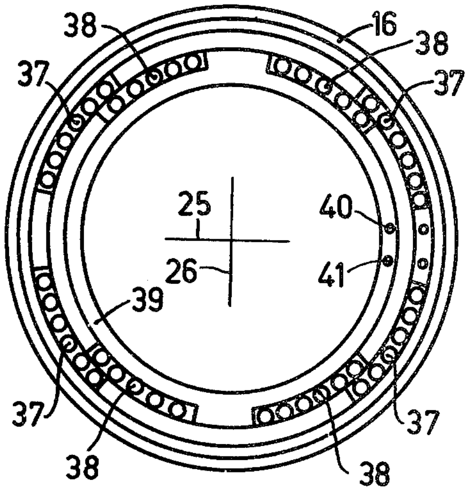
Figure 6:
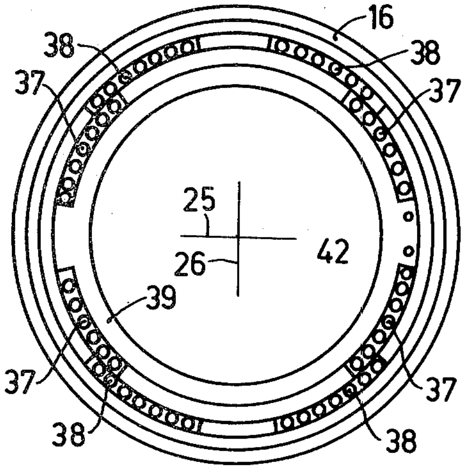
Figure 7:
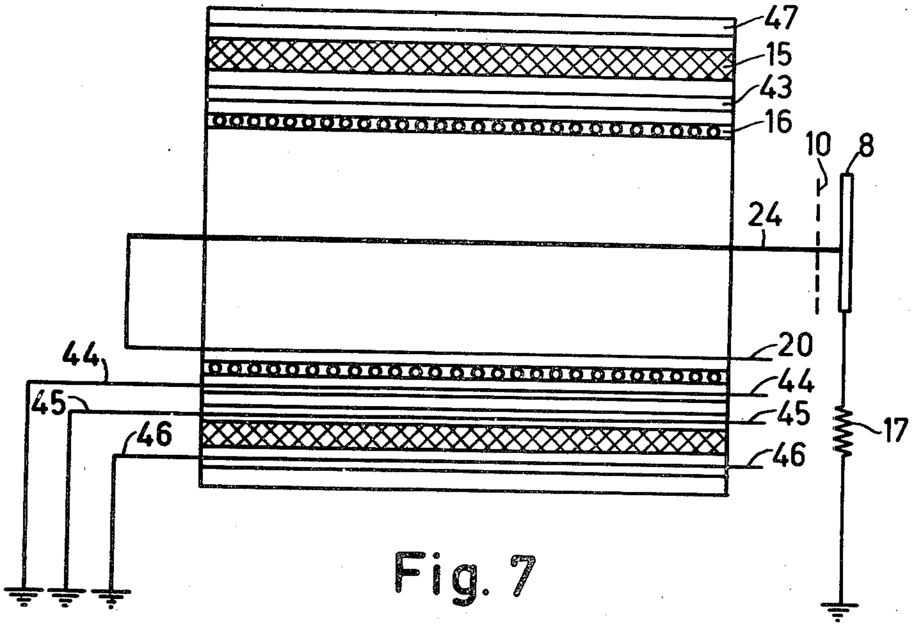

Some preferred embodiments according to the invention will be described in detail hereinafter with reference to the drawing. In the drawing:

FIG. 1 is a diagrammatic view of an electron-optical system having a television camera tube in which the use of a gauze-connection loop enveloping the wire-coil wall is avoided according to the invention, FIG. 2 is a diagrammatic view of an electron-optical system according to the invention in which the gauze-supply conductor is constructed as a twin conductor which is terminated with a potentiometer, FIG. 3 is a diagrammatic view of an electron-optical system according to the invention in which the gauze-supply conductor comprises two supply conductors which are diametrically arranged in the system, FIG. 4 is a diagrammatic view of an electron-optical system according to the invention in which the gauze-supply conductor is angularly stepped within the electron-optical system, FIG. 5 is a diagrammatic cross-sectional view of an electron-optical system according to the invention in which cut-outs are provided for the gauze-supply conductor, FIG. 6 is a diagrammatic cross-sectional view of an electron-optical system in which the locations of the frame-deflection coils and the line-deflection coils are interchanged with respect to the embodiment shown in FIG. 5, and FIG. 7 is a diagrammatic longitudinal sectional view of an electron-optical system according to the invention in which feasible return conductors for the gauze supply conductor are indicated.

In the television camera tube 1 shown in FIG. 1 an envelope 2 envelops an electron gun 3 having a cathode 4, a control grid 5, a second grid 6 and an anode 7. A mesh, grid or gauze electrode 10 is arranged near a target 8 which is provided on the inner side of an input window 9. The grid electrode 10, in this case arranged to be separate from the anode, is connected to a connection pin 12 via a grid-connection conductor 11. For reasons of symmetry, the grid-connection conductor 11 is substantially always composed of two grid connections which are diametrically arranged in the tube. Also known are television camera tubes in which the grid electrode is mounted on the end of the anode facing the target. In tubes of this kind the anode, also connected via a feed-through pin, acts as the grid-connection conductor. In the case of an appropriately symmetrical construction, the grid-connection conductor 11 composed of the diametrical grid connections as well as the gauze-connection conductor formed by the anode may be thought to be replaced by an imaginary gauze-connection conductor which coincides with a symmetry axis 13 of the television camera tube. Arranged about the television camera tube 1 is an electromagnetic deflection unit 14 which comprises line-deflection coils and frame-deflection coils (not separately shown) which are arranged at right angles thereto. Arranged about the deflection unit 14 is a magnetic focussing unit 15 which is in this case formed by a comparatively long coil, but which also may consist of, for example, a permanent magnetic device. A wire coil 16 is arranged between the deflection unit 14 and the focussing unit 15. The coil 16 is composed in known manner of a wire or tape of a soft magnetic material which is wound in a continuous helix and will be referred to hereinafter as wire coil for the sake of brevity. Coil 16 serves to intensify the magnetic deflection fields from unit 14, and it does this without any external connections. A wire coil which is stepped in the winding direction, as described in said U.S. Pat. No. 3,743,983 may alternatively be used. The target 8, a signal resistor 17, a connection 18 which is denoted by a broken line in FIG. 1, the connection pin 12, the grid-connection conductor 11 and the grid electrode 10 constitute, in conjunction with earth or ground (denoted by a line 19), the grid connection loop of the kind set forth which is always present in known arrangements. This grid-connection loop envelops the wire-coil wall and, consequently, voltages will be generated in this loop by the interfering magnetic field occurring in the wire-coil wall, said voltages resulting in interference currents in the signal resistor. According to the invention, a gauze-supply conductor 20 is provided which extends inside the wire coil and which is earthed on the target side of the television camera tube via a gauze-supply source not shown. A gauze-connection loop formed by the target 8, the signal resistor 17, the gauze-supply conductor 20, the connection pin 12, the gauze-connection conductor 11 and the gauze electrode 10 does not envelop the wire-coil wall, so that the interfering magnetic field present in the wire-coil wall cannot cause interference voltages in the gauze-connection loop.

So as to prevent interfering effects of the actual line-deflection field, the gauze-supply conductor, now situated within the space of the wire coil, must be arranged in a neutral plane of the line-deflection field.

Asymmetry in the gauze-connection conductor 11 or in the construction of the anode 7 near an anode gauze, often causes a residual voltage between the gauze electrode 10 and the target 8, the value of this residual voltage being dependent of the angular position of the television camera tube. According to the invention, the residual voltage can be eliminated by constructing the gauze-supply conductor to be either a twin conductor 21 or a multifilar conductor as is shown in FIG. 2. The twin conductor 21 is terminated with a potentiometer 22, the wiper 23 of which is connected, possibly via ground, to the end of the signal resistor 17 which is remote from the target. By adjusting the potentiometer, an effective gauze supply conductor, replacing the twin conductor 21, can be arranged in such a plane with respect to the imaginary gauze-connection conductor 24, not coinciding with the electron-optical axis 13 in this case due to the asymmetrical construction, that the residual interference voltage is also eliminated. The same result can be approximated by means of a selector switch, replacing the potentiometer, in the case of a multifilar supply conductor.

So as to illustrate their relationship with the complete system, FIG. 2 shows the wire coil 16, the gauze electrode 10, the target 8 and the direction of the line-deflection field 25 and that of the frame-deflection field 26. The potentiometer or the selector switch is adjusted while the television camera tube is in operation so that the absence of the interference signal itself can be used as the adjusting criterion.

As already stated, the gauze-supply conductor must be arranged in the neutral plane of the line-deflection field so as to prevent the actual line-deflection field (25) from exerting an interfering effect in the gauze-connection loop. In this position, the frame-deflection field (26), directed at right angles to the line deflection field, exerts a maximum interfering effect.

FIG. 3 shows an arrangement in which the resulting interference signals, small due to the comparatively low frequency of the frame-deflection field, can also be suppressed. To this end, the gauze-supply conductor is composed of two twin conductors 27 and 28 which are diametrically arranged in the coil system, each conductor being terminated on the target side by means of a potentiometer 29 and 30, respectively. By correct adjustment of the potentiometers 29 and 30, the effective supply wires resulting from each of the two twin conductors 27 and 28 are also arranged in a plane with the imaginary gauze-connection conductor 24 such that the interference signal caused by the line-deflection field as a result of asymmetry in the tube construction is eliminated. The interference signal caused by the frame-deflection field can be suppressed by suitable adjustment of a wiper 34 of the potentiometer 31 which connects the wipers 32 and 33 of the potentiometers 29 and 30.

FIG. 4 shows how the triple potentiometer adjustment of the preferred embodiment shown in FIG. 3 can be replaced by a version comprising a single potentiometer 35 for the line-deflection field. The gauze-supply conductor, constructed as a twin wire 36, is then stepped over 180° in an angular sense half-way the effective length of the deflection fields.

FIG. 5 is a cross-sectional view of a preferred embodiment of a deflection coil unit according to the invention. The figure shows the wire coil 16, two frame-deflection sections 37, two line-deflection sections 38 and a support 39 for the various coils. The support is provided with cut-outs 40 for a gauze-supply conductor, in this case in the form of a twin conductor. An alternative location is denoted by cut-outs 41. The location for the gauze-supply conductor denoted by 40 weakens the coil support 39 to some extent. The solution denoted by 41 is superior from this point of view, but has the drawback that the gauze-supply conductor is comparatively near to the wire coil 16. In the vicinity of the wire coil wall the already mentioned induction in the wires thereof causes a modulated, be it slight, warping of the line-deflection field. This modulated warping results in an interference signal in the gauze-connection loop.

A favourable compromise between the two locations for the gauze-supply conductor indicated in FIG. 5 is the construction which is shown in FIG. 6. In this figure, the location of the line-deflection coils and that of the frame-deflection coils is interchanged with respect to the construction shown in FIG. 5. The cut-outs 42 for the gauze-supply conductor do not weaken the support and are still at a substantial distance from the wire coil 16.

In a television camera tube arrangement, the tube-base side is usually better accessible than the target side. In all preferred embodiments described thus far, however, the gauze-supply conductor must be earthed at the target side and potentiometers have to be adjusted at this side. This may give rise to problems in practice, the more so since the potentiometer adjustments have to be effected on a tube in operation. These drawbacks can be eliminated by feeding the gauze-supply conductor through the electron-optical system and back to the tube-base side again. FIG. 7 shows a path which is suitable in practice and which extends between the wire coil 16 and a non-ferromagnetic screening can 43. This results in a return conductor 44. In coil systems used in practice, the screening can 43 is often rigidly connected to the focussing coil 15, and in this preferred embodiment the return conductor 44 can rotate with the deflection coils upon adjustment of these coils. A minor drawback of the location of the return conductor 44 is that it is situated comparatively near to the wire coil 16. As a result, interference related to penetration of the deflection fields and resultant eddy currents in the screening can may occur. The solutions represented by a position 45 at which the return conductor is situated between the screening can and the focussing unit 15 or by a position 46 where the return conductor is arranged between the focussing unit 15 and a screening 47 of a ferromagnetic material do not have this drawback. The advantage of the return conductor being capable of rotating with the deflection coils, however, is then lost. As is shown in the FIGS. 2 and 3 for the gauze-supply conductor, the return conductors can be constructed as a twin conductor or as a double conductor, and they may follow any path provided it is situated outside the wire coil 16. Due to the necessary arrangement outside the wire coil, there is no preferred angular position with respect to the deflection fields.

What is claimed is:

1. A device comprising a tube having a target, a mesh electrode disposed near said target, an interior mesh electrode conductor within said tube and coupled to said mesh electrode, and a signal output impedance element having a first end coupled to said target and a second end, a magnetic focusing coil disposed about said tube, an electromagnetic deflection coil means for generating a line deflection field, said deflection coil being disposed about said tube, said line deflection field having a neutral plane, a helical wire coil of soft magnetic material disposed between said focusing and deflection coils, an external mesh electrode supply conductor disposed in said neutral plane between said tube and said wire coil and having a first end means for coupling said external conductor to said interior conductor and a second end means for connecting said external conductor to said output impedance element second end; whereby said impedance element and said interior and external conductors form a loop that does not enclose said wire coil, thereby minimizing interference voltages between said target and mesh electrode.

2. A device as claimed in claim 1, wherein said external conductor extends inside the wire coil to the target side of the tube.

3. A device as claimed in claim 1, wherein said external conductor comprises a twin conductor within the axial distance over which the deflection fields are active, the two wires of the twin conductor being disposed in a plane transverse to the direction of the line-deflection field and in the immediate vicinity of the neutral plane of the line-deflection field, and further comprising a potentiometer on the target side of the tube coupled to said two wires.

4. A device as claimed in claim 1 wherein said external conductor comprises a multifilar conductor at least within the axial distance over which the deflection fields are active, the various wires of the multifilar conductor being arranged in a plane transverse to the direction of the line-deflection field and in the immediate vicinity of the neutral plane of the line-deflection field and further comprising a selector switch coupled to said multifilar wires and disposed on the target side of the tube.

5. A device as claimed in claim 1, wherein said external conductor comprises a double conductor, the two conductors of the double external conductor being diametrically arranged and in a neutral plane of the line-deflection field.

6. A device as claimed in claim 3, wherein said twin conductor is angularly stepped over 180° halfway the axial distance over which the frame deflection field is active.

7. A device as claimed in claim 1, further comprising a spacer means for supporting the coils and said external conductor.

8. A device as claimed in claim 7, wherein the location of the frame-deflection coils is inside of the line-deflection coils so as to achieve an advantageous position of the external conductor.

9. A device as claimed in claim 1, further comprising means for returning said external conductor from the target side of the tube to the tube-base side of the tube outside the wire coil.

10. A device as claimed in claim 1 further comprising a support means for the various coils having cut-outs for receiving said external conductor.

* * * * *